United States Patent [19]

Aguirre

[11] Patent Number: 5,580,931
[45] Date of Patent: Dec. 3, 1996

[54] METHOD OF MODIFICATION OF BULK POLYMERS WITH METAL CATALYZED IONIC POLYMERIZATION

[75] Inventor: Juan E. Aguirre, Hackensack, N.J.

[73] Assignee: Nathaniel H. Garfield, Harrison, N.Y.

[21] Appl. No.: 204,783

[22] Filed: Mar. 2, 1994

[51] Int. Cl.$^6$ .......................... C08F 255/02; C08F 259/04
[52] U.S. Cl. .......................... 525/274; 525/54.3; 525/366; 525/370; 525/400; 525/401; 525/426; 525/454; 525/455; 525/461; 525/468; 525/479; 525/518; 525/519; 525/537
[58] Field of Search .................................. 525/54.3, 274, 525/366, 370, 400, 401, 426, 454, 455, 461, 468, 479, 518, 519, 537

[56] References Cited

U.S. PATENT DOCUMENTS

| | | |
|---|---|---|
| 3,976,723 | 8/1976 | Williams . |
| 4,220,573 | 9/1980 | Bock . |
| 5,034,452 | 7/1991 | Kunz ........................ 524/560 |
| 5,202,381 | 4/1993 | Parker ........................ 525/85 |
| 5,319,031 | 6/1994 | Hamilton ................. 525/301 |

FOREIGN PATENT DOCUMENTS

| | | |
|---|---|---|
| 2127457 | 5/1990 | Japan . |
| 3294345 | 12/1991 | Japan . |

OTHER PUBLICATIONS

Translation of Japan 2–127457 (May 1990).

*Primary Examiner*—Vasu S. Jagannathan
*Attorney, Agent, or Firm*—Graham & James LLP

[57] ABSTRACT

A method for property modification of bulk polymers, by initially treating a short chain monomeric organic acid, having a carboxylic group (with dissociation constant between $10^{-2}$ to $10^{-6}$ cm$^{-1}$, and less than 8 carbons); with a Group IA, IIA or IIB metal, metal oxide, peroxide, hydroxide, or halogens, for forming a metal ligand or complex metal salt of the acid. The bulk polymers are mixed with the complex metal salts and free radicals are introduced into the mixture by means of oxidizing materials, to functionalize the bulk polymer with ionic polymerization sites. A copolymer formation is effected between the monomeric organic metal salt anion and the bulk polymer, as catalyzed by the metal cation, at such sites. The polymerization is a substantially non-cross linked ionic one resulting from the dissociation parameters and the short chain length of the complex metal salt, which is maintained prior to copolymer formation. Flow rate, elongation and tensile strength are improved over the original bulk polymer materials.

33 Claims, No Drawings

METHOD OF MODIFICATION OF BULK POLYMERS WITH METAL CATALYZED IONIC POLYMERIZATION

FIELD OF THE INVENTION

This invention relates to property modification of bulk polymers and rubbers and particularly to property modification by copolymerization with short chain monomers.

BACKGROUND OF THE INVENTION

Copolymerization of polymers is generally chemically effected by grafting of the polymeric moieties at the sites of unsaturated bonds, with extensive cross-linking between the copolymers in a tight bond. However, as a result of the copolymerization, the resultant copolymers comprise structures which are more rigid than the original polymers, with reduced tensile strength, flow rate and capacity for elongation. The networks so formed in the prior art are generally of long chains with a high degree of crystallinity. The polymers are occasionally interlaced with one another or are cross-linked chains and are amorphous in nature, with properties which depend, not on their crystalline structure but on the interaction between the molecules.

During the polymerization processes of the prior art, additives, stabilizers, plasticizers and the like are used to improve the polymer performance but such improvement is limited by the compatibility between the various components of the polymer. Thus, for example, some additives and plasticizers form phase separation with the matrix of the polymer.

Various methods have been utilized in order to graft varying monomers to a polymer backbone. These methods include chain transfer reactions, hydroperoxidation, degradation (mechanical and thermal), functional group reactions such as redox initiation and condensation of molecules containing hydroxyl, carboxyl, amine, thiol and ester groupings. In order to effect the appropriate grafting to a polymeric backbone, in the prior art, a vinyl monomer or unsaturated moiety was necessary in the monomer to successfully attach or graft it to the polymer. Examples of such monomers, utilized in the prior art, include methyl methacrylate, styrene, methacrylic acid, unsaturated carboxylic acids, butadienes, unsaturated organic oils, vinyl chloride, acrylonitrile, maleic anhydride, acrylic acid esters, isoprene, divinyl ether, conjugated diolefins, polyamides, propylene terephthalate, polyethylene terephthalate, vinyl acetate, methacrylonitrile, isocyanates, polyureas, polyurethane, polythioureas, glycidyl methacrylate, etc.

The above exemplified materials and combinations result, for the most part, in incompatible or semi-compatible systems, when grafted to polymers and copolymers, such as plastics and elastomers. Because of such incompatibility, to whatever degree occurring, properties are reduced from that of homogeneous systems. The reduction in various properties is not predictable except to the extent that there is a pattern of reduction of tensile strength with increasing content of the graft chain.

A new trend for blending non-similar polymers is the generation of copolymers which can act as compatibilizers or functionalizing materials. Examples of such materials include maleic anhydride (unsaturated carboxylic anhydride) used in the grafting of nylon and other thermoplastics. With such method, peroxide, in the presence of vinyl groups or double bonds, initiates the grafting to polymers. The vinyl groups may be substituted by reactive groups such as ($NH_2$), (CN), etc.

Another method is the grafting of polymers wherein a second polymer is formed during the grafting process. This, however presents problems not found with the grafting of pre-formed polymers. Specifically, the formation of the second polymer affects the mixing and distribution of the monomer in the polymer matrix, with the increasing of viscosity and lowering of monomer diffusion. This lowering of monomer diffusion also lowers the reaction rate by which the grafting moiety and the polymer will produce a copolymer which may function as an emulsifier to help impart homogeneity to the system.

With all such methods, basically the grafting has been effected by either polymerization of a vinyl containing monomer or an unsaturated material such as EPDM rubbers and maleic anhydride, wherein a free radical is produced by utilizing peroxides.

SHORT DESCRIPTION OF THE INVENTION

Generally the present invention comprises a process for the copolymerization modification of bulk polymers, comprising the steps of:

a) forming an ionizable complex metal salt of a short chain monomer of up to eight carbons. This is most preferably effected by treating an organic carboxylic acid, having a dissociation constant between $10^{-2}$ to $10^{-6}$ $cm^{-1}$, and preferably having less than eight carbons; with a member of the group consisting of metals (preferably in finely divided form), metal oxides, metal hydroxides, metal peroxides and halogen compounds of metals, wherein the metals are selected from Group IA, IIA, IIB metals of the Periodic Table; to form the complex metal salt of said organic acid;

b) functionalizing the bulk polymer to provide ionic reaction sites thereon; and c) mixing said complex metal salt with said functionalized bulk polymer, and ionizing the complex metal salt to form an organic anion and a metal cation, whereby said organic anion is copolymerized with said bulk polymer at said ionic reaction sites, with an ionic polymerization catalyzed by said metal cation.

The functionalizing of the bulk polymer may occur prior to or even after the mixing of the bulk polymer with the complex metal salt.

The complex metal salt is not an organo-metallic material but is instead a readily ionizable salt. The organic acid anion is preferably a relatively short chain monomer to minimize any cross-linking with the polymer backbone and to facilitate access of the anion to the functionalized reaction sites. There are little or no compatibility problems because the bonding is an ionic one and the polymer and monomer are not otherwise reacted with one another except to the extent that the monomer appears to fill in empty spaces in the polymer backbone, whereby the polymer is not rigidified, such as by cross-linking. As a result, there is a marked improvement in flow rate, elongation and tensile strength over the original bulk polymer materials, regardless of their nature. In addition, natural rubber behaves like a thermoplastic polymer, when ionically copolymerized as described.

It is an object of the present invention to provide a method for modifying the properties of substantially any bulk polymer, including natural rubber, by copolymerization at saturated and unsaturated bonds, with compatibility being independent of the nature of the bulk polymer.

It is a further object of the present invention to provide such modification of bulk polymer properties to increase any or all of tensile strength, flow rate and capacity for elongation.

It is a still further object of the present invention to provide a method for copolymerization with reduced or limited degree of cross-linking.

It is yet another object of the present invention to provide a method for ionic copolymerization of a bulk polymer with a relatively short chain monomer, with the monomer filling in open spaces in the bulk polymer, to an extent limited only by the volume of the open spaces and the number of ionic polymerization sites.

These and other objects, features and advantages of the present invention will become more evident from the following discussion and examples.

DETAILED DESCRIPTION OF THE INVENTION

The present invention comprises a method for physical property modification or transformation of bulk polymers, and the so modified bulk polymers. Examples of particularly useful bulk polymers include polyethylene (PE), polypropylene (PP), polyvinyl chloride (PVC), natural rubber, and the like. Other useful bulk polymers are those having free volumes into which short chain monomers can enter for ionic polymerization linkage therewith. Since the present invention is not dependent on a chemical interaction or cross-linking reactions, the nature of the bulk polymer is generally irrelevant except to the extent that it contains fillable free volume, and wherein the bulk polymer has sites suitable for functionalizing for ionic polymerization with the short chain monomers, which fill the free volume, to a desired extent.

Specific bulk polymers which can be modified for property enhancement, in accordance with the present invention, include acrylics, acetal, ABS (acrylonitrile butadiene styrene), SAN (styrene acrylonitrile), ACS (acrylonitrile chlorinated polyethylene styrene), amino resins ($NH_2$), cellulosic (nitrate, acetate) epoxy, fluoroplastics and fluoroelastomers, nitrile resins, nylon (6; 6,6; 11; 12; 6,10; 6,12), polycarbonate, polybutylene, polyethylene and polypropylene copolymers, ionomers, polyphenylene sulfide, polystyrene, polyurethane, silicone, SBR (elastomers), polysulfone, polyethersulfone, polyaryl-sulfone thermoplastic elastomers, and alloys and blends of the above.

In accordance with the present invention, the bulk polymers (rubber and long chain saturated polymers are included in the term "bulk polymers") are ionically copolymerized with a readily ionizable complex metal salt of a short chain monomer. The complex metal salt is preferably prepared by the steps of initially treating a short chain organic acid, having a carboxylic group (with dissociation constant (K) between $10^{-2}$ to $10^{-6}$ $cm^{-1}$, and preferably less than eight carbons), e.g., formic, lactic, malonic, citric, ortho-phthalic, acrylic, succinic, glycolic, glutaric, maleic, and itaconic acids; with an oxide, peroxide, hydroxide or halogen compound of a Group IA, IIA or IIB metal, or the metal itself (preferably the metal is a divalent alkaline earth metal), for forming a metal ligand or complex metal salt of the acid. Metal peroxides, e.g. magnesium and calcium peroxides, are particularly useful in effecting the metal salt formation.

The bulk polymers are thoroughly mixed with the complex metal salts, and are functionalized, i.e., with formation of ionic polymerization sites, preferably after such mixing. The mixing is effected such as in an extruder, and free radicals are introduced into the mixture (to functionalize the bulk polymer), such as by means of addition of a highly oxidizing material, such as a peroxide, e.g. dicumyl peroxide. This functionalizes the bulk polymer to provide ionic reaction sites for ionic polymerization with the salt anion. Thereafter there is a resultant homopolymer formation between the organic metal salt anion and the functionalized bulk polymer, with a polymerization catalyzed by the metal cation. The polymerization is a substantially non-cross linked ionic one resulting from the dissociation parameters and short chain length of the complex metal salt. The metal salt anion appears to fill in gaps in the bulk polymer but without cross-linking. Resultant homopolymer materials, including those containing bulk polymers of PE, PP and PVC, show improvement in flow rate, elongation and tensile strength over the original bulk polymer materials, and natural rubber behaves like a thermoplastic polymer.

In order to assist in the free radical formation which functionalizes the bulk polymer, it is desirable that a co-agent be utilized with the peroxide in order to catalyze the reaction. Examples of co-agents useful in this regard, include trimethyl propane trimethacrylate, ethylene glycol dimethacrylate and zinc diacrylate, which allow the formation of more reactive free radicals to improve the rate of cure (with elastomers) and the state of cure. A characteristic of suitable co-agents is a polar nature with a tendency to cause coupling or homopolymerization. This is an important characteristic in the present invention since formation of the homopolymer opposes the tendency to form cross-linkages and is a preferred reaction mechanism. Where high reactivity is not desired, alternative co-agents of lesser polarity are useful and these include 1,2 poly butadiene, triallylcyanurate, triallyl isocyanurate, and triallyl trimellitate. A useful formulation for high density polyethylene is a combination of glycolic acid, itaconic acid, and formic acid, as the monomer acid, together with t-butyl peroxy diisopropyl benzene, triallyl cyanurate and calcium peroxide. The triallyl cyanurate in this formulation may be replaced by a more reactive co-agent or even one of lower polarity, depending upon the properties to be obtained including tensile, elongation, modulus, etc. The amount of co-agent to be used is important in avoiding cross linking but is generally no more than about one to two parts for effectiveness in maintaining the dynamics necessary for aiding in coupling and reduction of cross-linking.

The organic peroxides useful as a source of free radicals in effecting the functionalization of the bulk polymer in the method of the present invention are determined by several factors. These factors include decomposition temperature, compatibility and solubility in the particular system, and the type of radical being produced. The radicals which attack the particular polymeric materials are highly preferred therewith.

Peroxyesters and peroxydicarbonates are particularly preferred materials for introduction of the free radicals which functionalize the bulk polymer. Among the peroxyesters, t-butyl peroxypivalate and t-butyl peroxyneodecanoate are preferred as well as their analogs of t-amyl and acumyl compounds. For example, with PVC, PE and polystyrene the t-amyl peroxyesters are preferred. Dicumyl peroxide is the preferred choice when rubber linkages are part of the polymer system. Peroxyketals, such as t-amyl peroxyketals, particularly 1,1, di(t-amyl peroxy) cyclohexane and ethyl 3,3, di(t-amyl peroxy) butyrate are difunctional with good thermal stability. Among the peroxyesters, compounds such as t-butyl peroctoate are particularly useful in polyethylene in order to initiate polymerization. T-amyl peroxyesters are highly active with respect to bulk polymers in forming selective radicals.

The metal, utilized in the organic salt of the present invention, serves the dual purpose of initially dissociating from the organic acid salt to provide the anionic monomer moiety which undergoes the ionic copolymerization with the bulk polymer and, as a metal cation, it catalyzes the ionic copolymerization between the organic acid anion and the functionalized bulk polymer. Suitable metals providing such characteristics include the Group IA, IIA and IIB metals of the Periodic Table and particularly the divalent Group IIA metals of calcium and magnesium. The metal cations may remain, even after the catalyzed polymerization has been completed, without significantly affecting the properties of the modified bulk polymer. If desired, the metal cations may be removed by causing them to be solubilized and washed out. Alternatively, the metal cations may be modified, structured and distributed, to provide conductivity or semiconductivity within the ionically polymerized matrix.

Relatively high K dissociation acids and salts are required to provide the anionic copolymerizing moiety and the catalyzing metal cation. For effective utilization, the organic acid should have a dissociation constant (K) ranging between $10^{-2}$ to $10^{-6}$ cm$^{-1}$ and preferably between $10^{-2}$ to $10^{-5}$ cm$^{-1}$. The acid salts are in the form of electrolytes, when utilized and are also preferably functionalized to the ionic components after their diffusion through the polymer molecule (into the free volume fraction or holes), such as by thorough mixing. Functionalization of the acid salts, is preferably effected by the presence of strain and heat with the presence of free radicals. This functionalization results in the formation of anionic monomer moieties and the cationic metal catalysts.

The electrolyte structure (anionic monomer moiety) should have very stable molecules with high strength of chemical bonding and the number of overall carbon molecules should preferably be no more than 8 and preferably no more than 7, since the increase in number of carbons results in lower activity with respect to the ionic grafting and polymerization. In accordance with the present invention, the simpler the structure of the electrolyte, the greater the extent of diffusion within the spaces of the bulk polymer and the greater the extent of modification thereof.

More specifically, the complex metal salts of the present invention are preferably produced in a ribbon blender by spraying the precursor acid into a support or absorbent such as silicon dioxide, having a particle size ranging between about 0.5 microns and about 3.0 microns, with a uniform distribution of a pre-calculated amount. Thereafter, the metal is added to the blender in the most appropriate form (e.g., finely divided metal, oxide, peroxide, and hydroxide) in order to control the exothermic reaction which occurs with the formation of the salt. Once the metal salt is formed, it is removed and dried under low pressure with substantially complete elimination of water. Thereafter, the dried salt is mixed with the bulk polymer, as described above, in a batch mixer, extruder and the like, to diffuse the salt through the polymer to form a homogeneous single phase system of the present invention.

The salt appears to have a pronounced effect on the rheology of the bulk polymer at the initial stage of the blending, with a marked drop in viscosity and an increase in polymer flow. Increasing electrolyte content and concentration results in increasingly greater drop in viscosity. This is in contrast to normal copolymer grafting wherein there is generally an increase in viscosity under such conditions, with resultant difficulty of continued copolymerization, because of decreased diffusion of one polymer into the other.

Furthermore, it is observed that in the second-order transition temperature there is only a single glass transition temperature (Tg) instead of the two glass transition temperatures of usual graft copolymers. In addition, the homopolymer seems to impart a three dimensionality to the polymer with a compatible modulus, joining elongation and tensile ability. It is also observed that the lower the Tg, the higher the concentration of the electrolyte material.

The lowering of the Tg, without otherwise affecting any of the other physical properties, permits the elimination of plasticizers from the formulation, the presence of which tends to deteriorate physical properties of the copolymer. The lower the Tg, the greater the ability of the polymer chain to rotate with concomitant increase in chain flexibility. The Tg value is also directly related to the degree of free volume occupancy by the electrolyte, with the lower the Tg, the greater the occupancy. With the higher occupancy of free volume, there is an increased resistance to solvents and elevated temperatures. The copolymer is rendered insoluble with 10–20% of the copolymer being represented by the homopolymer produced from the electrolyte. The nature of the copolymer is affected by a homopolymer content of at least 5%, with properties being optimized with increase of electrolyte up to about 20% with generally a levelling off thereafter. However, despite the increase in homopolymer content there is complete compatibility at all concentration levels.

Since the effect of the present invention is that of void filling, without otherwise affecting the chemical nature of either the bulk polymer or the monomer, it is believed that continued addition of monomer, to the extent of complete filling of the voids in the polymer backbone, is possible without deterioration of the enhanced properties initially obtained. Accordingly, the effective upper limit of a monomer to bulk polymer ratio is ultimately determinable by the available voids in the particular bulk polymer backbone in conjunction with the size of the particular monomer.

In order to illustrate the method of the present invention and the efficacy of the products resulting from such method, the following examples are presented. It is understood that the examples are for illustrative purposes only and that details contained therein are not to be construed as limitations on the present invention. Percentages, when given, are with respect to the percentage in the respective finished formulations as described.

EXAMPLES 1–3

(ORGANIC ACID SALT FORMULATIONS)

An organic acid salt (Formula I) was initially prepared by blending talc (14.5%) with diatomite (15.0%) and MgO (2.0%-light density) and adding the mixture to calcium peroxide (7.5%) and calcium carbonate (5.0%) with continued mixing. When the mixture became homogeneous, it was slowly added to a blend of glycolic acid (15.0%) and formic acid (40.0%). The pH was about 4.2, with the pH being maintained in the range of 4.0–4.9 by addition of MgO, CaO, or glycolic acid and a conductance in the range of $10^{-3}$ to $10^{-5}$ cm$^{-1}$.

A second organic acid salt (Formula II) was prepared with a blend of silicon dioxide (23.0%), glycolic acid (40.0%), itaconic acid (10.0%), formic acid (15.0%) and calcium peroxide (12.0%).

A third organic salt (Formula III) was prepared from the blend of clay (13.0%), silicon dioxide (10.0%), glycolic acid (65.0%) and calcium peroxide.

EXAMPLE 4

Five hundred (500) parts by weight of high density polyethylene was mixed with fifty (50) parts of Formula II, five (5) parts dicumyl peroxide, ten (10) parts barium sulphate, and four (4) parts magnesium hydroxide. After mixing, the mixture was added to an extruder of L/D 2511 and compression ratio of 3, with a ¾" screw. The temperature of the die was 190° F. with a pressure of 900 psi. The resultant copolymer had a smooth appearance without surface defects. The extrudate further had a flexibility of a rubber with a tensile strength of 5900 psi, an ultimate elongation of 750%, and a flexural modulus in excess of 1200, The copolymer was placed in the solvents of acetone, alcohol, methyl ethyl ketone, xylene and gasoline for periods of time in excess of a week without ill effect.

EXAMPLE 5

A copolymer was made in accordance with the procedure of Example 4 but with 50 parts of Formula III, instead of Formula II. The resultant copolymer provided an ultimate tensile strength of 5350 psi, elongation of 630% and a flexural modulus of 925, with similar solvent resistance.

EXAMPLE 6

(control)

High density polyethylene, without copolymerization as in Examples 4 and 5, provided ultimate tensile strength of 1650 psi, elongation of 375% and flexural modulus of 792 and it dissolved in all of the solvents described in Example 4.

EXAMPLE 7

A copolymer was made in accordance with Example 4 but with five hundred (500) parts of polyvinyl chloride, instead of polyethylene, and the die was at a temperature of 380° F. The resultant copolymer provided a tensile strength of 5200, an ultimate elongation of 525%, flexular modulus of 1710, impact strength of 580 ft/lb a melt index of 365 gms/10mts at 380° F. and a specific gravity of 1.68. Solvent resistance was similar to that of the polyethylene copolymers of Examples 4 and 5.

EXAMPLE 8

(control)

Pure unmodified PVC provided 1650 psi, ultimate elongation of 420%, flexular modulus of 620, impact strength of 32 ft/lb, a melt index of 505 gms/10mts at 380° F., and a specific gravity of 1.66.

It is evident from the above examples that the ionic copolymerization of the present invention provides markedly improved desirable characteristics of tensile strength, elongation, flexular modulus and solvent resistance, when compared to the original bulk polymers being modified. Should additive materials be desired for obtaining various characteristics it is desirable that the copolymerization of the present invention be first effected before the inclusion of such additive materials such as fillers. It appears that filler materials retard the improvement of properties if prematurely added. To obviate this problem and to improve dispersion, the electrolyte materials are formed in the blend with the bulk polymers, whereby fillers, added therewith are more uniformly dispersed. In addition, pigments and other additives may be similarly uniformly dispersed while maintaining the improved properties of the bulk polymer. Factors required in optimizing the effect of the copolymerization include the high conductivity of the electrolyte material and maintaining the proper pH. It is also important that the formation of the copolymer follows the steps of: a) initially producing a stable, dried complex salt, b) while ensuring that the electrolyte does not contain elements that may kill or retard anionic polymerization, and c) with free radicals being formed to assist in grafting and polymerization.

EXAMPLE 9

Five hundred parts of polypropylene (isotactic) are mixed with sixty parts of Formula II, five parts dicumyl peroxide, and four parts magnesium oxide, with copolymerization being effected as in Example 4, but with an extruder temperature of 390° F. The resulting copolymer had a melt index of 620 gms/10 minutes/at 420° F., a tensile strength of 4600 psi, an elongation of 585%, modulus of elasticity of 1350, a compression set of 14%, and an impact strength of 1950 ft/lb. The polypropylene copolymer was resistant to acetone, MEK, mineral acid (HCl), gasoline and methanol, even after a one week period of immersion. There was no swelling of the copolymer in any of the solvents during the immersion periods.

EXAMPLE 10

(control)

Pure polypropylene melts at the rate of 715 gms/10 minutes/at 420° F. Pure polypropylene has a tensile strength of 2300 psi, an elongation of 265%, modulus of elasticity of 920, compression set of 42%, and an impact strength of 36 ft/lb. The polypropylene dissolved in the solvents of Example 9 during the immersion periods.

Lack of swelling of the copolymer of Example 9 in any of the solvents can be directly attributable to the high degree of occupancy of the homopolymer in the holes or voids between the bulk polymer chains.

Natural rubbers have the desirable characteristics of initial good tensile strength, modulus of elongation and low cost. However, the lack of resistance of rubber to oxidation, ozone, reactive chemicals and fluids, generally handicap utilization of rubber for many applications, particularly under conditions of high heat. With the present invention, general purpose resistant plastics such as polyethylene can be modified to have properties similar to rubber without degradation problems and with the performance levels similar to or superior to engineering plastics such as nylon and polycarbonate. Conversely, with the method of the present invention, rubber itself can be modified to increase degradation resistance and with improvement of overall properties.

EXAMPLE 11

Five hundred parts of natural rubber (ribbed smoked sheet) was mixed with fifty parts of Formula III, five parts dicumyl peroxide, four parts calcium peroxide and 0.5 parts sulphur. The mixture was cured at 350° F. for about five minutes. Resistance to solvents is improved over natural rubber.

It is understood that the above examples are illustrative of the present invention and the extent of improvement over the prior art. Details contained therein are not to be construed as limitations of the present invention and changes in parameters, components, relative amounts, and the like are possible without departing from the scope of the present invention as defined in the following claims.

What is claimed is:

1. A process for the copolymerization modification of bulk polymers, comprising the steps of:
   a) mixing a bulk polymer with an ionizable metal salt of an organic monomer having no more than eight carbons, and wherein the metal is selected from the group consisting of Group IA, IIA and IIB metals of the Periodic Table;
   b) functionalizing the bulk polymer with functionalizing means to provide ionic polymerization sites thereon;
   c) ionizing said ionizable metal salt to an organic monomer anion and a metal cation; and
   d) ionically polymerizing said organic monomer anion with said functionalized bulk polymer at said ionic polymerization sites;
   wherein said organic monomer anion comprises at least 5% by weight of said ionically polymerized bulk polymer.

2. The process of claim 1, wherein said metal cation catalyzes the ionic polymerization.

3. The process of claim 2, wherein said metal is a Group IIA metal.

4. The process of claim 3, wherein said metal is either magnesium or calcium.

5. The process of claim 1, wherein said ionizable metal salt of an organic monomer is initially prepared by treating an organic carboxylic acid, having a dissociation constant between $10^{-2}$ to $10^{-6}$ $cm^{-1}$, with a member of the group consisting of metal, metal oxides, metal hydroxides, metal peroxides and halogen compounds of metals, wherein the metal is selected from the group consisting of Group IA, IIA and IIB metals of the Periodic Table; to form a complex metal salt of said organic acid.

6. The process of claim 5, wherein said organic carboxylic acid is treated with either magnesium or calcium peroxide.

7. The process of claim 5, wherein said bulk polymer is polyethylene, said acid is a combination of glycolic acid, itaconic acid, and formic acid, and wherein said polymer is treated with functionalizing means comprising calcium peroxide and said bulk polymer being further treated with a co-agent selected from the group consisting of t-butyl peroxy diisopropyl benzene, and triallyl cyanurate.

8. The process of claim 1, wherein said ionizable metal salt is diffused within said bulk polymer, prior to said functionalizing of the bulk polymer.

9. The process of claim 8, wherein said diffusion is effected by mixing said bulk polymer and said ionizable metal salt in an extruder.

10. The process of claim 1, wherein said ionizable metal salt is dried, to substantially completely remove all of the water content thereof, prior to said ionic polymerization.

11. The process of claim 1, wherein said ionizable metal salt is functionalized in order to facilitate said ionic polymerization by application of strain and heat thereto.

12. The process of claim 1, wherein said functionalizing of the bulk polymer is accompanied by addition of cross-linking suppression means to said bulk polymer to cause favorable ionic polymerization reactions over cross-linking reactions.

13. The process of claim 1, wherein the said organic monomer anion comprises between about 5–20% by weight of said ionically polymerized bulk polymer.

14. The process of claim 1, wherein said bulk polymer comprises a free volume and wherein said organic monomer anion is present in said free volume in an amount from 5% by weight of said ionically polymerized bulk polymer up to that sufficient to completely fill said free volume.

15. The process of claim 1, wherein said metal remains in said ionically polymerized bulk polymer.

16. The process of claim 15, wherein said metal is dispersed and configured within said ionically polymerized bulk polymer to provide conductivity or semiconductivity therewithin.

17. The process of claim 1, wherein said bulk polymer is selected from the group consisting of polymeric acrylics, acetal, ABS (acrylonitrile butadiene styrene), SAN (styrene acrylonitrile), ACS (acrylonitrile chlorinated polyethylene styrene), amino resins ($NH_2$), cellulosic (nitrate, acetate) epoxy, fluoroplastics and fluoroelastomers, nitrile resins, nylon (6; 6,6; 11; 12; 6,10; 6,12), polycarbonate, polybutylene, polyethylene, polypropylene, polyethylene and polypropylene copolymers, ionomers, polyphenylene sulfide, polystyrene, polyurethane, silicone, SBR (elastomers), polysulfone, polyethersulfone, polyaryl-sulfone, thermoplastic elastomers, polyvinyl chloride, natural and synthetic rubber and alloys and blends thereof.

18. The process of claim 17, wherein said bulk polymer is selected from the group consisting of polyethylene, polypropylene, polyvinyl chloride, nylon and natural and synthetic rubber.

19. The process of claim 1, wherein said organic monomer is selected from the group consisting of formic, lactic, malonic, citric, ortho-phthalic, acrylic, succinic, glycolic, glutaric, maleic, and itaconic acids.

20. The process of claim 1, wherein said bulk polymer is functionalized with free radicals.

21. The process of claim 20, wherein organic peroxides provide the source of said free radicals.

22. The process of claim 21, wherein said organic peroxides are selected from the group consisting of peroxyesters, peroxyketals and peroxydicarbonates.

23. The process of claim 22, wherein said peroxyesters are selected from the group consisting of t-butyl peroxypivalate, t-butyl peroxyneodecanoate, and their analogs of t-amyl and acumyl compounds.

24. The process of claim 22, wherein said peroxyester is t-butyl peroctoate and said bulk polymer is polyethylene.

25. The process of claim 22, wherein said peroxyketals are selected from the group consisting of t-amyl peroxyketals.

26. The process of claim 25, wherein said peroxyketals are selected from the group consisting of 1,1, di(t-amyl peroxy)cyclohexane and ethyl 3,3, di(t-amyl peroxy)butyrate.

27. The process of claim 23, wherein said bulk polymer is selected from the group consisting of PVC, PE and polystyrene and said organic peroxyester is a t-amyl peroxyester.

28. The process of claim 21, wherein said peroxide is dicumyl peroxide.

29. The process of claim 28, wherein said bulk polymer is comprised of rubber.

30. The process of claim 20, wherein said bulk polymer is further treated with a co-agent, in addition to said functionalizing means, to cause formation of more reactive free radicals.

31. The process of claim 30, wherein said co-agent is selected from the group consisting of trimethyl propane trimethacrylate, ethylene glycol dimethacrylate, 1,2 poly butadiene, triallylcyanurate, triallyl isocyanurate, triallyl trimellitate, and zinc diacrylate.

32. The process of claim 31, wherein said bulk polymer is an elastomer.

33. The process of claim 30, wherein said co-agent is polar, with a tendency to cause coupling or homopolymerization, in preference to formation of cross-linkages as a preferred reaction mechanism.

* * * * *